United States Patent [19]
Janz et al.

[11] Patent Number: 5,387,972
[45] Date of Patent: Feb. 7, 1995

[54] COHERENT PHASE AND FREQUENCY DETECTION USING SUM-FREQUENCY MIXING IN NON-LINEAR WAVEGUIDES

[75] Inventors: Siegfried Janz; Edward Frlan, both of Ottawa; Hongxing Dai, Gloucester; Francoise Chatenoud; Richard Normandin, both of Ottawa, all of Canada

[73] Assignee: National Research Council of Canada, Ottawa, Canada

[21] Appl. No.: 31,496

[22] Filed: Mar. 15, 1993

[51] Int. Cl.$^6$ ................................................. G01B 9/02
[52] U.S. Cl. .................................... 356/345; 356/349; 356/351; 356/354
[58] Field of Search ................ 356/345, 349, 351, 354

[56] References Cited

U.S. PATENT DOCUMENTS

| | | |
|---|---|---|
| 5,051,617 | 9/1991 | Normandin et al. ............... 359/328 |
| 5,082,340 | 1/1992 | Aoshima et al. ................... 359/328 |
| 5,111,466 | 5/1992 | Normandin et al. ............... 356/326 |
| 5,120,131 | 6/1992 | Lukosz ............................... 356/345 |
| 5,200,795 | 4/1993 | Kim et al. ........................... 356/351 |
| 5,239,364 | 8/1993 | Matsuzaki .......................... 356/345 |
| 5,255,068 | 10/1993 | Emo et al. ......................... 356/351 |

Primary Examiner—Rolf Hille
Assistant Examiner—Minhloan Tran

[57] ABSTRACT

A plurality of signals are mixed in a non-linear waveguide for generating a near field sum frequency output pattern. The near field output pattern is monitored for changes which correspond to changes in the phase relationship between the plurality of signals. A grating provides a mask through which the near field pattern may propagate. Detectors positioned above the grating at predetermined locations measure the intensity of the near field pattern and a change in the phase relationship between the input signals is determined from a change in the intensity of the near field output pattern.

14 Claims, 6 Drawing Sheets

COHERENT PHASE AND FREQUENCY DETECTION USING SUM-FREQUENCY MIXING IN NON-LINEAR WAVEGUIDES

FIELD OF THE INVENTION

The invention relates to coherent optical systems and, more particularly to an apparatus and method for detecting a phase difference between coherent optical beams.

BACKGROUND OF THE INVENTION

In a variety of optical systems, it is necessary to assure that two or more separate optical signals are in phase. More particularly, it is necessary that their optical path difference (OPD) be made equal to within a fraction of a wavelength to assure proper coherence. The need for such coherence control is found in phased array laser transmitters/receivers and certain advanced array laser transmitters/receivers and certain advanced telescopes. For instance to realize the full potential of a phased array laser transmitter, the wavefronts emerging from its different telescopes should all lie on a common sphere, centered at a target. Thus, the individual laser beams need to be focused to the same range and pointed to a common point. The optical path lengths through the separate telescopes must be controlled so that the beams will add coherently at the receiver or the target. While means for controlling the OPD of a coherent beam are known in the art, a cost effective method for providing signals to operate the phase control apparatus has not been so clearly evident.

The phase control mechanism may be a mirror mounted on a piezo-electric or other electro-active substrate which can be moved in accordance with an applied signal voltage. One system of deriving a control signal for such a mirror actuator is described by R. R. Butts et al in "A Concept For A Phased Array Laser Transmitter", Proceedings of SPIE, Volume 440, pgs. 188–125. Butts et al describe a system wherein samples from two beams under consideration are projected on a segmented detector array, the beams interacting to create an interference pattern. This interference pattern is the Fraunhofer diffraction pattern of the two beam samples (i.e. "double slit"). It comprises a series of bright and dark fringes modulated by a low frequency envelope. The detector array comprises a substantial number of individual photodetector segments, or pixels, which respond to the light and dark fringes by providing an electrical output signal proportional to the amount of light incident upon each pixel. Those signals are detected and the system then searches of the maximum intensity of the pattern. The maximum is used as the center of a subsequent pattern search: the date from the pattern search is processed; and a control signal is generated to modify the OPD such that the power levels are symmetrical about this central maximum. When this is achieved, the two optical beams are said to be in phase.

In a paper entitled "Analysis of Phase Measurement Algorithms Utilizing Two Beam Interference", Butts, Proceedings of SPIE, Volume 440, pgs. 130–134, a number of algorithms are described which are used in the analysis of OPD induced interference patterns.

The implementation of the Butts algorithm can be difficult. Butts' implementation employs many individual detectors, each of whose outputs must be sampled and all of whose outputs must be analyzed to determine where the maximum radiance exists. Sampling requires a clock cycle per detector, so the time required for the analysis is substantial, given the need for a large number of detectors to accurately detect the light and dark areas of the fringe pattern. Once each of these outputs is known, the system then requires considerable computing power to locate the region of interest in the interference pattern and perform the algorithm.

Harrell et al. in U.S. Pat. No. 4,942,581 entitled Optical Phase Detection and Control System, issued Jul. 17, 1990 discloses a system for determining the phase relationship between two coherent beams. Harrell's system combines beams to create an interference fringe pattern. Although the system appears to perform its intended function, it requires a complex optical system including costly mirrors requiring precise positioning.

Sum-frequency (SF) generation in nonlinear waveguides can be employed to convert infrared light to visible light, as well as to carry out signal processing functions such as wavelength separation and autocorrelation. Until recently, the SF power emitted from the surface of such nonlinear waveguides has been too low for practical application. However, a new multilayer waveguide structure, developed by Normandin et al. Electron. Lett. 26, 2089 (1990) has a SF generation efficiency several orders of magnitude larger than conventional homogeneous waveguides. As a result, there is a renewed interest in the application of SF generation in waveguides for various optoelectronic devices including spectrometers, correlators, and coherent visible light sources. In particular, the emission direction of the SF light relative to the surface normal varies with the difference in frequency of the two counter-propagating pump beams. High resolution spectrometers and wavelength division demultiplexers using nonlinear waveguides take advantage of this phenomenon. However, attention has not been given to the dynamics of the near field SF radiation pattern as the phase and frequency of the input beams is varied.

It is an object of the invention to provide a simplified optical phase detection system.

It is a further object of the invention to provide a simple method for detecting a change in the phase relationship between a plurality of signals.

In accordance with the invention there is provided, a method of detecting a change in the phase relationship between a plurality of signals comprising the steps of mixing the plurality signals in a nonlinear waveguide to produce a near field output pattern at the surface of the waveguide which corresponds to a phase relationship between the input signals; and, monitoring the near field output pattern at the surface of the waveguide for changes in the pattern, wherein a change in the pattern corresponds to a change in the phase relationship between the input signals.

In accordance with another aspect of the invention, there is provided a system for determining a phase relationship between a plurality of coherent beams comprising: non-linear waveguide means for providing a near field output pattern at the surface of the non-linear waveguide means in response to mixing four orthogonal polarized light beams within the waveguide, wherein two of the beams are counter propagating with two of the other beams; and detection means positioned to receive at least a portion of the near field output pattern and for detecting the intensity of the received portion of the near field output pattern at the surface of the waveguide.

BRIEF DESCRIPTION OF THE DRAWINGS

Exemplary embodiments of the invention will be described in conjunction with the drawings in which:

FIG. 1b is a graph of a near field output pattern emitted from a non-linear waveguide shown in FIG. 1a;

DETAILED DESCRIPTION

Figure 1A:
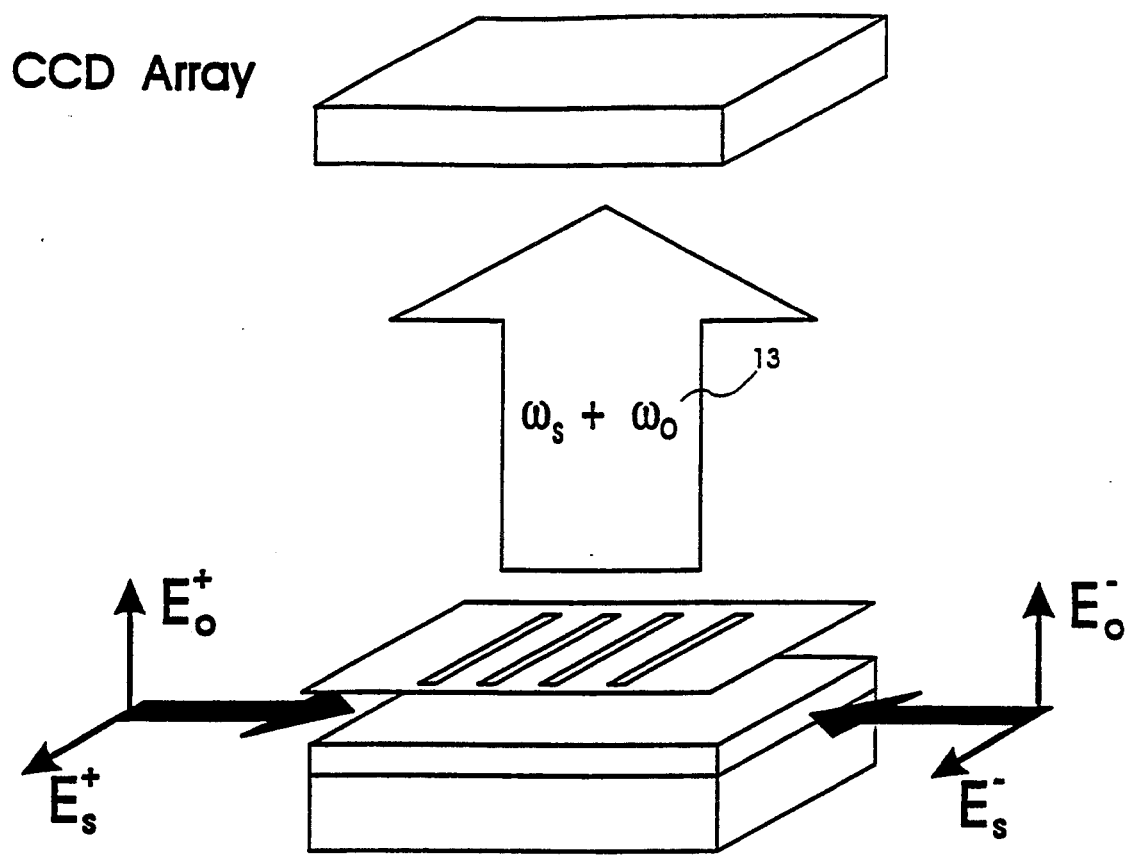
FIG. 1a is a diagram of a phase detector in accordance with the invention.

Referring to FIG. 1a, an optical phase detector is shown having a sum-frequency (SF) mixing in a nonlinear waveguide 12; a mask in the form of a grating 14 is positioned at the waveguide 12 surface. Light detecting means in the form of a charged coupled device (CCD) is positioned above the grating 14 to receive and detect light that passes through openings 15 in the grating 14. By monitoring the near field output pattern 13 of the SF light radiated from the waveguide 12 for changes, the relative phase of two input light beams 16 and 17 mixed within the waveguide 12 can be measured. By using an $Al_xGa_{1-x}As$ waveguide optimized for SF generation with $\lambda=1.06$ μm input light, a simple phase detector is capable of resolving phase shifts of less than 0.2 radians. This phase detector is may also be used in an interferometer configuration as a GHz resolution frequency monitor.

Figure 2:
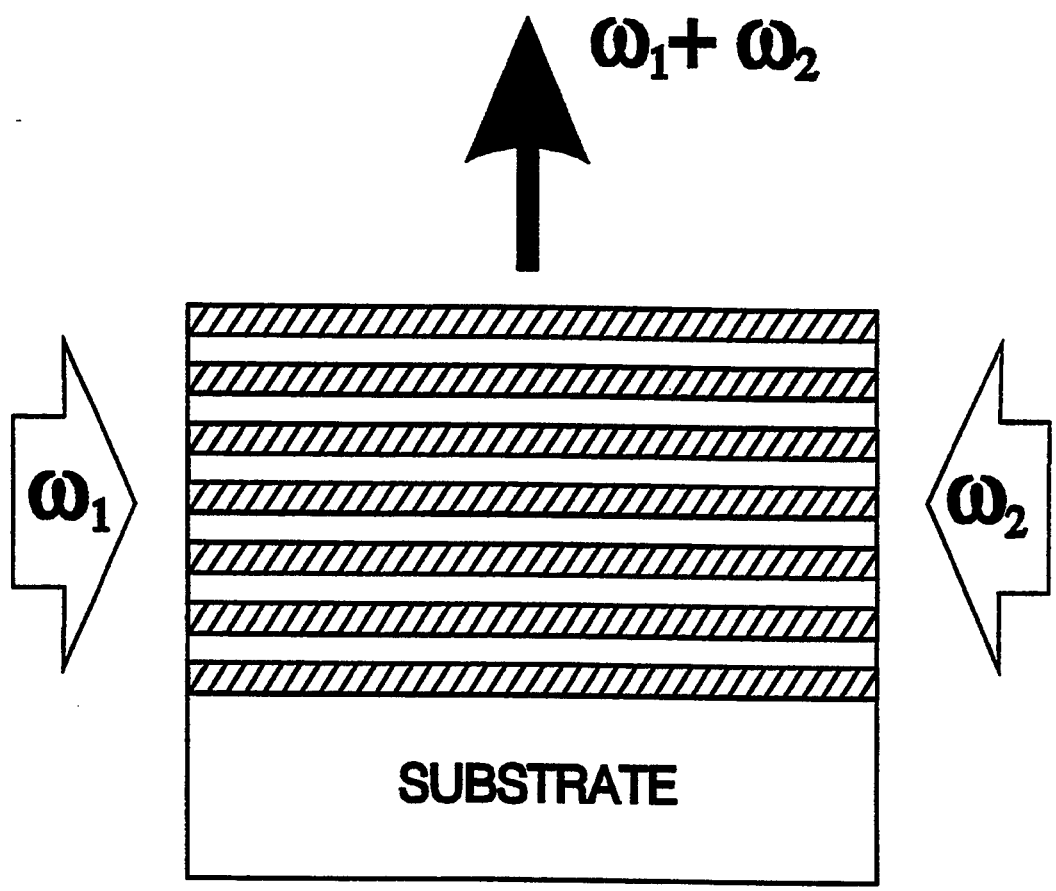
FIG. 2 is a cross sectional view of a non-linear waveguide.

As shown in FIG. 2, in a multilayer $Al_xGa_{1-x}As$ waveguide grown on a (100) substrate, SF light is generated by the nonlinear interaction of a TE polarized mode and a counter propagating TM polarized mode. The resulting polarization at the sum-frequency $\Omega=\omega_1+\omega_2$ has the form $$P(\Omega)=\chi^{SF}:E^{TE}(\omega_1)E^{TM}(\omega_2)$$

where $\chi^{SF}$ is the sum frequency susceptibility tensor of the material, and $E^{TE}(\omega_1)$ and $E^{TM}(\omega_2)$ are the TM and TE electric fields. This polarization will radiate SF light from the waveguide surface.

The waveguide shown in FIG. 1a is pumped by two counter-propagating TE modes, $E_s^+$ and $E_s^-$ at frequency ωs, and two counter-propagating TM modes, $E_o^+$ and $E_o^-$ at frequency ωoo. The electric fields of the four modes or beams propagating in the guide are given by the following equations.

$$E_s^+=E_s\cos(k_s^{TE}x-\omega_s t+\Phi 1)$$

$$E_o^+=E_o\cos(k_o^{TM}x-\omega_o t+\Phi 2)$$

$$E_s^-=E_s\cos(k_s^{TE}x-\omega_s t+\Phi 3)$$

$$E_o^-=E_o\cos(k_o^{TM}x-\omega_o t+\Phi 4)$$

Figure 1B:
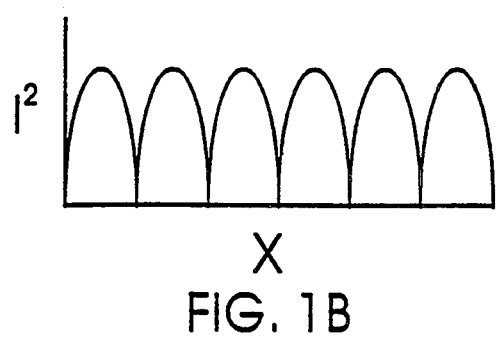

In the equations x denotes distance along the propagation direction of the waveguide. The total induced SF polarization at the sum frequency $\Omega=\omega_1+\omega_2$ is $$P(\omega)=2\chi^{SF}E_sE_o\cos(\Lambda x+\Psi/2)\cos(\Omega t-\xi/2)$$

where $\Lambda=k_s^{TE}-k_o^{TM}$ is the wave vector difference between the TM and TE modes, and $\Psi=\Phi 1-\Phi 2+\Phi 3+\Phi 4$. The additional phase factor $\xi=\Phi 1+\Phi 2+\Phi 3+\Phi 4$ determines only the temporal phase and hence does not effect the results described here. The SF intensity emitted from the surface varies as $|P(\Omega)|^2$ in the near field (i.e. just above the surface), and hence has the form $$I(\Omega)=I_o\cos^2(\Lambda x+\Psi/2)$$

as shown in FIG. 1b. The position of this intensity pattern will shift as the phase $\Psi$ is varied. Thus, variations in $\Psi$, and hence in the phase of any one of the pump beams, can be determined from the shift of the near field intensity pattern. For example, if the relative phases of three input beams are constant, then changes in the phase of the fourth input beam can be determined by measuring the SF intensity transmitted through a grating mask 14, where the grating period matches the period of the near field SF intensity pattern.

As the phase of one input shifts, the transmitted SF intensity oscillates. Thus the accumulated phase shift can be determined by counting oscillations of the SF intensity. It may be desirable to measure phase shifts smaller than 2π. In such cases, the SF pattern (or the grating mask 14 position) can be adjusted so that the transmission is halfway between minimum and maximum. Small variations in phase of one of the inputs are then linearly proportional to corresponding variations of the transmitted SF intensity. This waveguide phase detector can also be employed as the key element in a frequency detector. If the counter-propagating signal frequency inputs $E_x^+$ and $E_s^-$ are derived from the same source, but with a path length difference l between them, then the phase of the SF near field intensity pattern is given by $\Psi=\omega_s l/c-$ where $\Phi_o$ is the phase difference for l=0. Thus, the variation of $\omega_2$ can be measured by monitoring the SF intensity transmitted through the grating mask. If an identical path length difference is also introduced between inputs at frequency $\omega_o$, then the SF intensity will vary only as the difference $\omega_s-\omega_o$ between the two frequencies.

Figure 3:
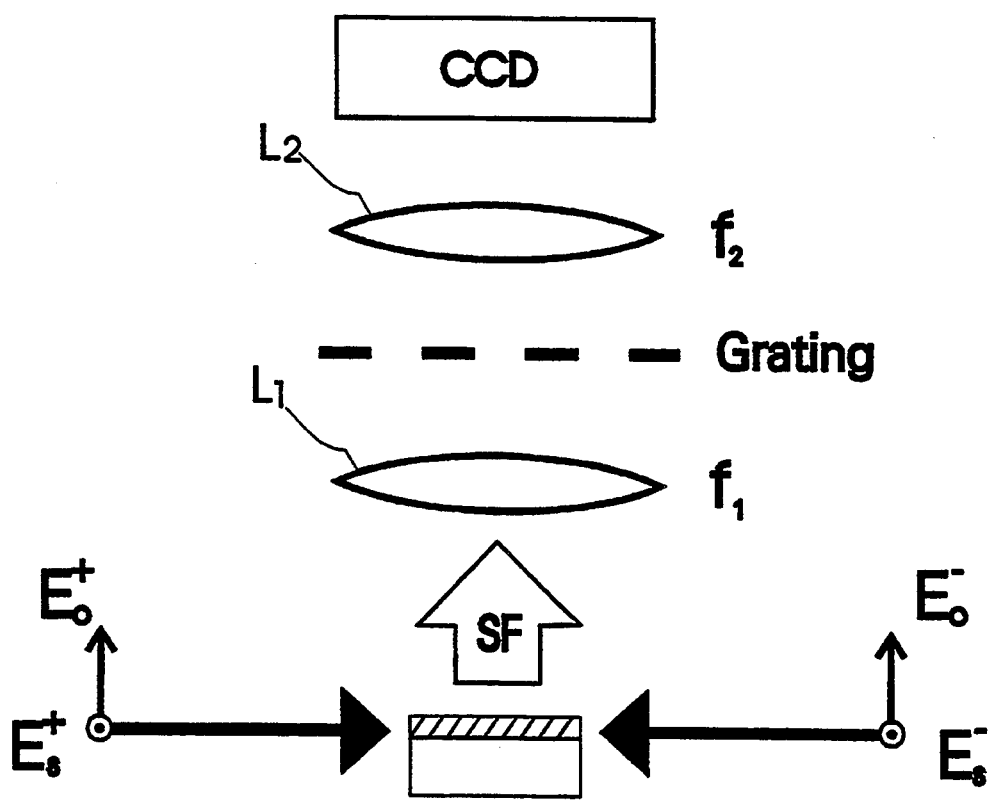
FIG. 3 is a phase detector including lenses for focusing a near field ouput pattern on a detector array.
Figure 4:
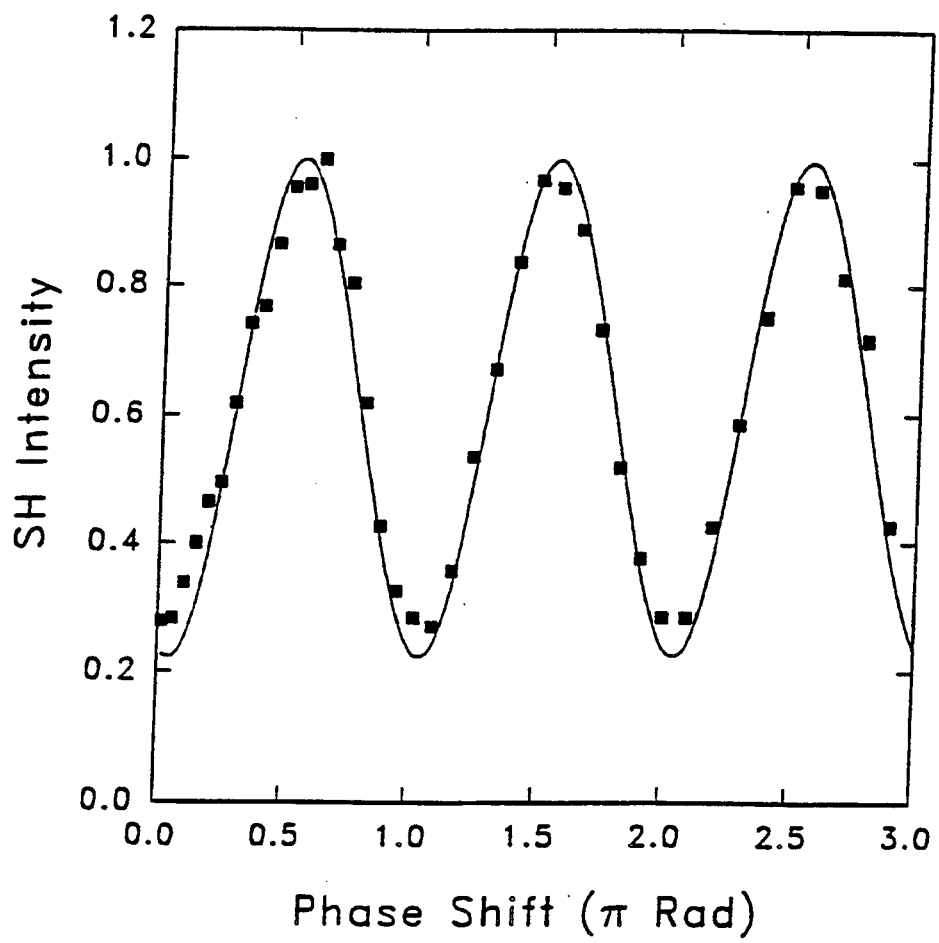
FIG. 4 is a graph of phase shift vs. intensity for a non-linear waveguide phase detector.
Figure 5:
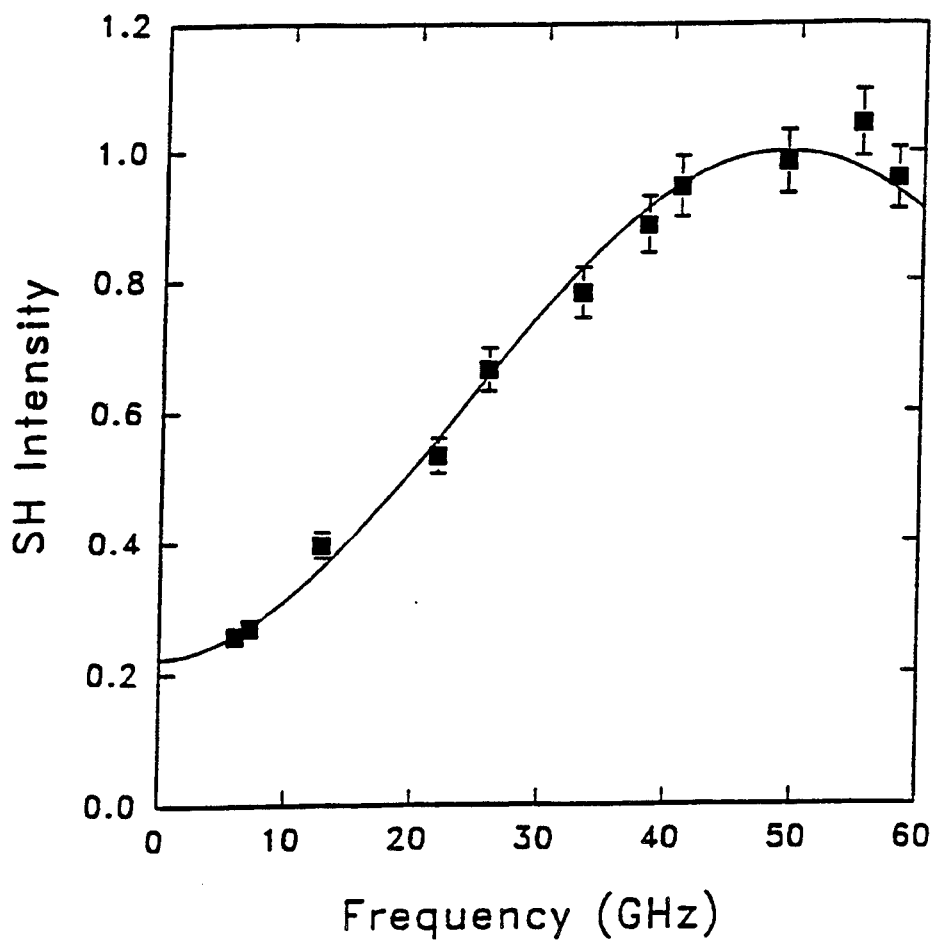
FIG. 5 is a graph of the frequency vs. intensity and shows the measured variation of the detected SF-light intensity as the frequency was scanned over approximately 60 GHz.

Referring to FIG. 2 a waveguide phase detector is shown using a 1 μm thick slab waveguide consisting of alternating layers of $AL_{0.7}Ga_{0.3}As$ and $Al_{0.9}Ga_{0.1}As$ on top of a 2 μm thick $AL_{0.7}Ga_{0.3}As$ cladding layer. The thickness of each layer is one half the wavelength of the sum-frequency light in the material. The growth conditions of this structure is described by R. L. Williams, F. Chatenoud, and R. Normandin in the Journal of Crystal Growth 111, 1066 (1991). The length of the waveguide is 1.5 min. The experimental arrangement is shown in FIG. 1a. The signal and reference beams are all provided by a Q-switched Nd:YAG laser operating at 1.06 μm (i.e. with $\omega_2=\omega_o$) with a 200 ns pulse width and a 10 KHz repetition rate. The incident beam width in the waveguide is approximately 20 μm. For approximately 0.5 W (peak power) of light coupled into the guide, 5 nW (peak power) of SF light is generated. The resulting near field SF intensity pattern has a period of approximately 120 μm. The phase Ψ is varied by passing the $E_s+$input beam through a 1 mm glass plate which could be rotated about an axis perpendicular to the beam direction, resulting in a change in path length through the glass. As shown in FIG. 3, the near field SF radiation pattern emitted from the waveguide is imaged onto a Ronchi grating with a line spacing of 250 μm using a lens $L_1$ of focal length $f_1=14.5$ mm. The position of the lens and grating are adjusted so that the modulation period of the near field image matches the grating period exactly. As a result, the transmitted SF intensity is modulated as the near field radiation pattern is shifted by varying the phase. The transmitted SF intensity is then focused onto a cooled CCD array by a second lens $L_2$ of focal length $f_2=50$ mm. FIG. 4 shows the measured variation of the SF intensity with phase shift. The solid line shows the transmitted SF intensity calculated for the geometry of this experiment. A phase shift of $\pi/2$ results in a change in measured intensity of a factor of five. The smallest detectable phase shift in test results was limited to approximately 0.2 radians by fluctuations in the measured SF intensity. These fluctuations in the measured signal are due to fluctuations in the power of the incident laser. This configuration was also used to demonstrate the application of the nonlinear waveguide for frequency detection. In the experiment the path length of the $E_s+$beam, from the source to the waveguide input facet, was 3 mm longer than that of the $E_s-$beam. Thus a change in frequency Δm of the source laser introduced a relative phase shift of approximately $(\Delta\omega \times 10^{-12})$ between these two beams. As a result, the transmission through the grating mask varied with laser frequency. The frequency of the laser was tuned by rotating an intracavity etalon. FIG. 5 shows the variation of the detected SF light intensity as the frequency was scanned over approximately 60 GHz. The solid curve is the theoretical prediction for the transmitted intensity. As before, the scatter in the measured data points, and hence the limited frequency resolution, is due primarily to the fluctuations in the incident laser power.

Figure 6:
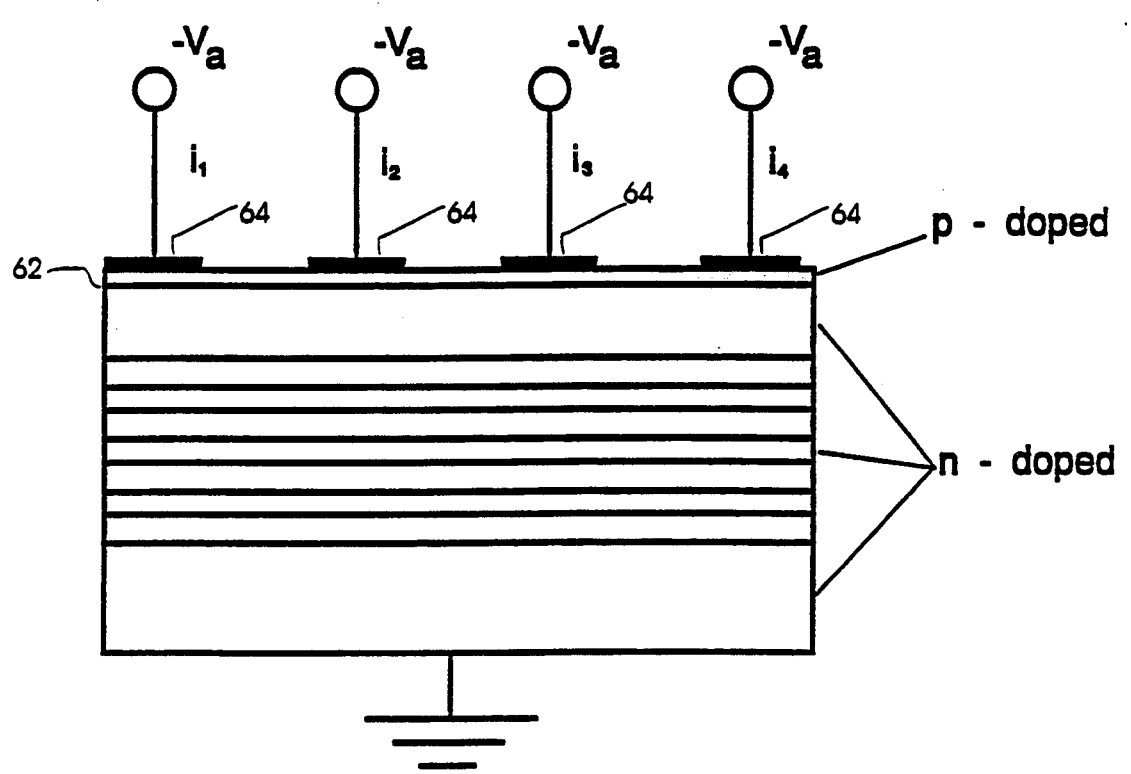
FIG. 6 is a cross sectional view of a non-linear waveguide including an integrated detector array for monitoring a near field output radiation pattern.

Of course, alternative embodiments may be realized. For example the grating shown in FIG. 1a can be directly applied to the surface of the waveguide 12. In another embodiment, a monolithic phase detector is shown in FIG. 6 having detectors which are grown directly on the surface of the waveguide for detecting the near field pattern.

An important application of this device is as a frequency detection element in frequency locking systems. A path length difference of a few millimeters, which is realizable in a monolithic waveguide circuit, will cause adjacent maxima and minima of the transmitted intensity to be separated by several GHz. In such a monolithic device, changes in frequency of less than 100 MHz are measurable by monitoring changes in the SF intensity level. By introducing identical path length differences between both the $\omega_s-\omega_o$ inputs, the relative frequency difference between the two can be monitored. As a coherent frequency detector, this scheme has a unique advantage over conventional heterodyne techniques, since the signal is converted directly to base band. There is no intermediate difference frequency signal at $\omega_s-\omega_o$ that requires further electronic processing. As a phase detector, this waveguide device performs the same function as a simple interference device where two beams are combined onto a single detector. However, this device is unique in that the phase measurement does not affect the measured beam, since the ratio of SF power to incident beam power is typically less than $10^{-6}$. Hence negligible depletion of the incident beams occurs. Furthermore, since the SF intensity will be at approximately twice the frequency of the incident beams, detectors may be used which are not sensitive to the fundamental frequency. This device may therefore be useful for signal processing at wavelengths in the infrared beyond the range of available photodetectors. Furthermore, as shown in FIG. 6, photodetectors can be grown directly on the waveguide surface to locally monitor the near-field radiation pattern. Hence, the grating masks and external detectors can be eliminated, making this scheme ideal for optoelectronic integrated circuit applications. Referring to FIG. 6 a conventional photodiode comprising a p-n junction 62 is shown. As light illuminates the junction, carriers are generated and current flows across the p-n junction 62 diode. A photodiode array can be fabricated on a GaAs/AlGaAs nonlinear waveguide as shown in FIG. 6. The guiding region and substrate are n-doped. A thin layer of p-doped material is grown at the surface where the guided fundamental light does not reach. This creates a p-n junction across the surface of the waveguide. The photodiode array is formed by depositing a series of metal electrodes 64 or contacts across the surface of the guide as shown in the figure. When a negative voltage is applied to these electrodes, the p-n junction is reverse biased. Any sum frequency light propogating up from the guiding region will now generate carriers in the junction, resulting in a measurable current flow through the contacts 64. The spatial variation of the near field sum frequency intensity can be determined from the variation from electrode to electrode of the photo-induced current. Hence, grating masks and external detectors can be eliminated, making this scheme ideal for optoelectronic integrated circuit applications. The resolution and speed of nonlinear waveguide phase and frequency detectors are limited only by the sensitivity of the SF light detector, the stability of the reference light source(s), and the transit time of the light across the waveguide.

In summary, SF mixing in nonlinear $Al_xGa_{1-x}As$ waveguides can be used to design waveguide phase and frequency detectors. This device has applications as high speed demodulator in frequency-shift-keying (FSK) and phase-shift-keying (PSK) coherent communications systems, as well as a feedback element for frequency locking of several lasers relative to a single reference source for wavelength multiplexing systems.

What I claim is:

1. A method of detecting a change in the phase relationship between a plurality of signals comprising the steps of:

mixing the plurality signals in a nonlinear waveguide to produce a near field output pattern at the surface of the waveguide which corresponds to a phase relationship between the plurality of signals; and, monitoring at least one location along the surface of the waveguide of at least part of the near field output pattern for changes in the intensity at the at least one location, wherein a change in the intensity of the pattern at the at least one location corresponds to a change in the phase relationship between the plurality of signals.

2. A method as defined in claim 1 wherein the step of monitoring comprises the steps of:
    allowing the at least some of the near field output pattern at the surface of the waveguide to propagate through a grating; and,
    measuring the intensity of the near field pattern after it has propagated through the grating to obtain a measured intensity value.

3. A method as defined in claim 2 further comprising the step of comparing one measured intensity value with another previously measured value to determine a change in the phase relationship between the input signals.

4. A method as defined in claim 1 wherein the step of monitoring comprises the step of:
    measuring the intensity of the near field pattern at the surface of the waveguide to obtain a measured intensity value.

5. A method as defined in claim 4 further comprising the step of comparing one measured intensity value with another previously measured value to determine a change in the phase relationship between the input signals.

6. A method as defined in claim 1 wherein the plurality of signals comprise four light beams of which three have a constant relative phase relationship.

7. A method as defined in claim 1 wherein the plurality of signals being mixed comprise four light beams, two of the four beams being orthogonally polarized.

8. A method as defined in claim 7 wherein a third light beam is of the same polarization as the orthogonally polarized light beams.

9. A method as defined in claim 8 wherein the near field output pattern is comprised of sum frequency light corresponding to the mixed signals.

10. A method of detecting a change in the phase relationship between a plurality of signals comprising the steps of:
    mixing the plurality signals in a nonlinear waveguide to produce a near field output pattern at the surface of the waveguide which corresponds to a phase relationship between the input signals;
    monitoring at least some of the near field output pattern at the surface of the waveguide for changes in the pattern, wherein a change in the pattern corresponds to a change in the phase relationship between the plurality of signals.

11. A system for determining a phase relationship between a plurality of coherent beams comprising:
    non-linear waveguide means for providing a near field output pattern at the surface of the non-linear waveguide means in response to mixing the plurality of polarized light beams within the waveguide, wherein two of the beams are counter propagating with two of the other beams;
    a grating with a plurality of openings for allowing at least some of the near field output pattern to propagate therethrough and opaque areas for preventing a portion of the near field output pattern from passing therethrough; and
    detection means positioned to receive the near field output pattern which propagates through the openings in the grating.

12. A system as defined in claim 11 wherein the waveguide is comprised of layers of $AL_{0.7}Ga_{0.3}As$ and $Al_{0.9}Ga_{0.1}As$.

13. A system for determining a phase relationship between a plurality of coherent beams comprising:
    non-linear waveguide means for providing a near field output pattern at the surface of the non-linear waveguide means in response to mixing four polarized light beams within the waveguide, wherein two of the beams are counter propagating with two of the other beams;
    detection means positioned to receive at least a portion of the near field output pattern and for detecting the intensity of the received portion of the near field output pattern at the surface of the waveguide: and,
    a grating positioned to receive light from the near field output pattern from an emitting surface of the waveguide, the grating having openings for allowing the light to pass therethrough and positioned between the detectors and the light emitting surface of the waveguide so that light passing through the openings of the grating may be detected by the detection means.

14. A system as defined in claim 13 wherein the waveguide is comprised of layers of $AL_{0.7}Ga_{0.3}As$ and $Al_{0.9}Ga_{0.1}As$.

* * * * *